United States Patent
Bi et al.

(10) Patent No.: US 6,374,099 B1
(45) Date of Patent: Apr. 16, 2002

(54) HIGH PRIORITY AND/OR EMERGENCY OVERLOAD ACCESS CONTROL SYSTEM

(75) Inventors: Qi Bi, Morris Plains; Ching Yao Huang, Randolph; Frances Jiang, Whippany; Yuen-Yin L. Koo, Morristown; Amit Shah, North Bergen, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/307,911

(22) Filed: May 10, 1999

(51) Int. Cl.[7] .............................................. H04M 11/00
(52) U.S. Cl. ....................... 455/404; 455/434; 455/450; 455/509; 455/512; 455/515; 370/329; 370/348
(58) Field of Search ................................. 455/404, 521, 455/403, 422, 512, 522, 434, 450, 509, 510, 515, 527; 320/230, 329, 348

(56) References Cited

U.S. PATENT DOCUMENTS

| | | | | |
|---|---|---|---|---|
| 5,615,249 A | * | 3/1997 | Solondz | 455/450 |
| 5,729,542 A | * | 3/1998 | Dupont | 370/346 |
| 5,752,193 A | * | 5/1998 | Scholefield et al. | 455/452 |
| 5,884,148 A | * | 3/1999 | Bligic et al. | 455/74.1 |
| 6,067,457 A | * | 5/2000 | Erickson et al. | 455/512 |
| 6,112,101 A | * | 8/2000 | Bhatia et al. | 455/512 |
| 6,115,596 A | * | 9/2000 | Raith et al. | 455/404 |
| 6,157,627 A | * | 12/2000 | Olofsson | 370/329 |

FOREIGN PATENT DOCUMENTS

| | | | | |
|---|---|---|---|---|
| WO | WO 87 07800 A | 12/1987 | | H04M/1/66 |
| WO | WO 98 23108 A | 5/1998 | | H04Q/7/22 |
| WO | WO 98 23109 A | 5/1998 | | H04Q/7/38 |

* cited by examiner

*Primary Examiner*—Nay Maung
*Assistant Examiner*—Temica M. Davis
(74) *Attorney, Agent, or Firm*—Julio A. Garceran

(57) ABSTRACT

A high priority and/or emergency overload access control system treats a wireless unit as a higher priority wireless unit when the wireless unit is attempting to access a wireless communications system with a high priority call, such as an emergency call. For example, the overload access control system can recognize if the wireless unit is attempting to initiate a call to an emergency number. If so, the wireless unit can perform a persistence test as an emergency class (e.g. overload class 10–15) wireless unit in attempting to access the wireless communications system. Thus, the wireless unit will experience an increased probability of passing the persistence test and thereby reducing the persistence delay in attempting to access the wireless communications system with the emergency call.

14 Claims, 7 Drawing Sheets

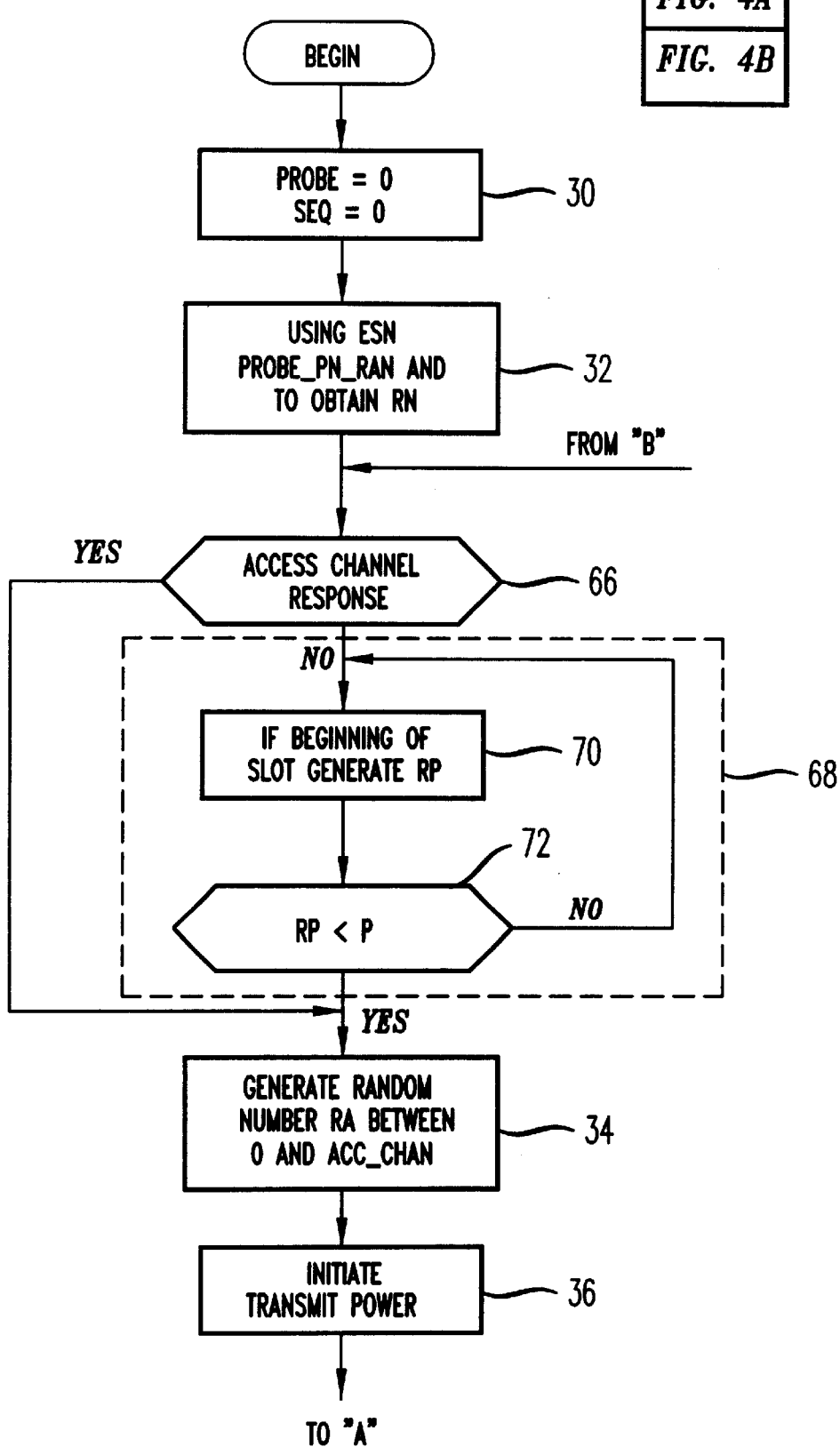

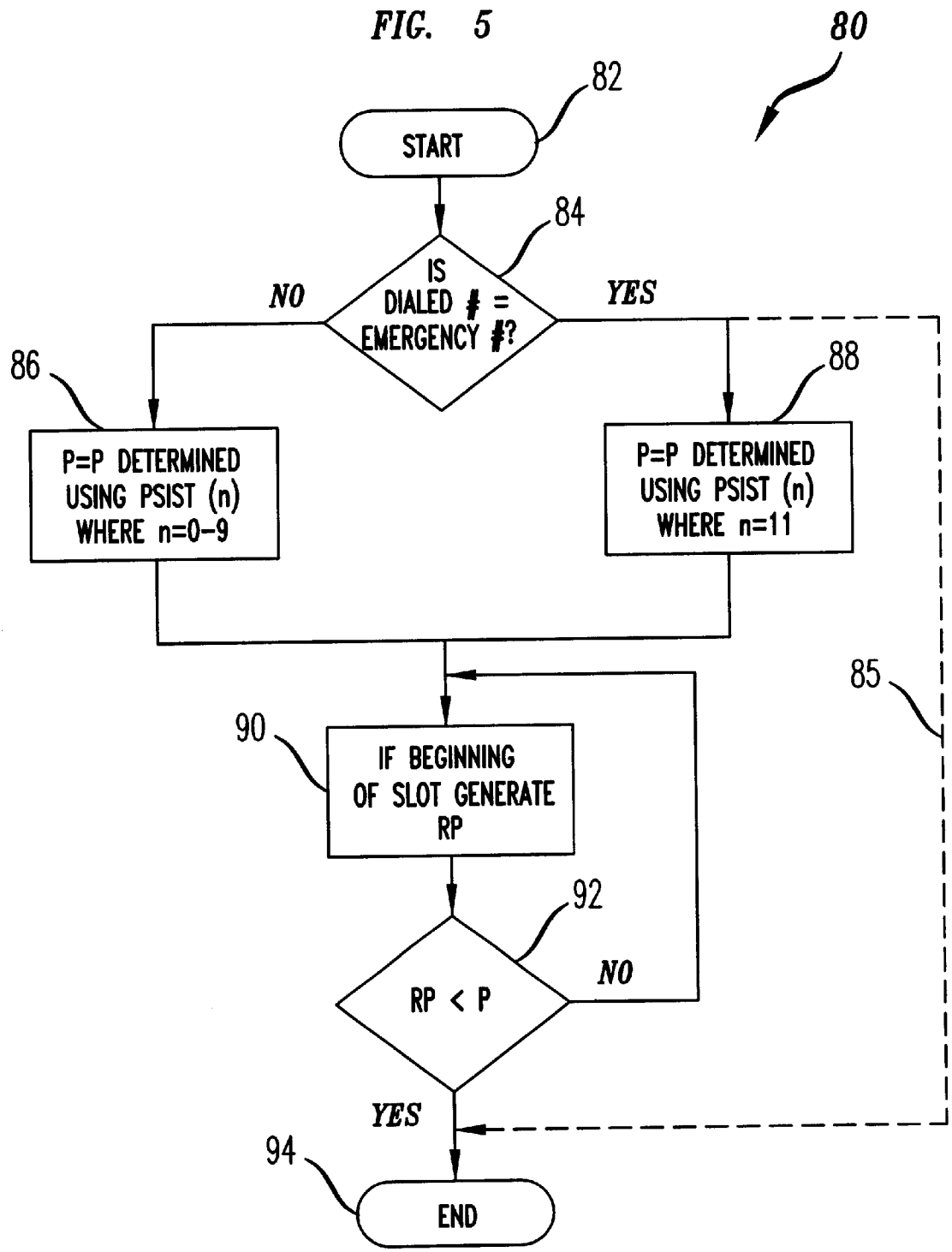

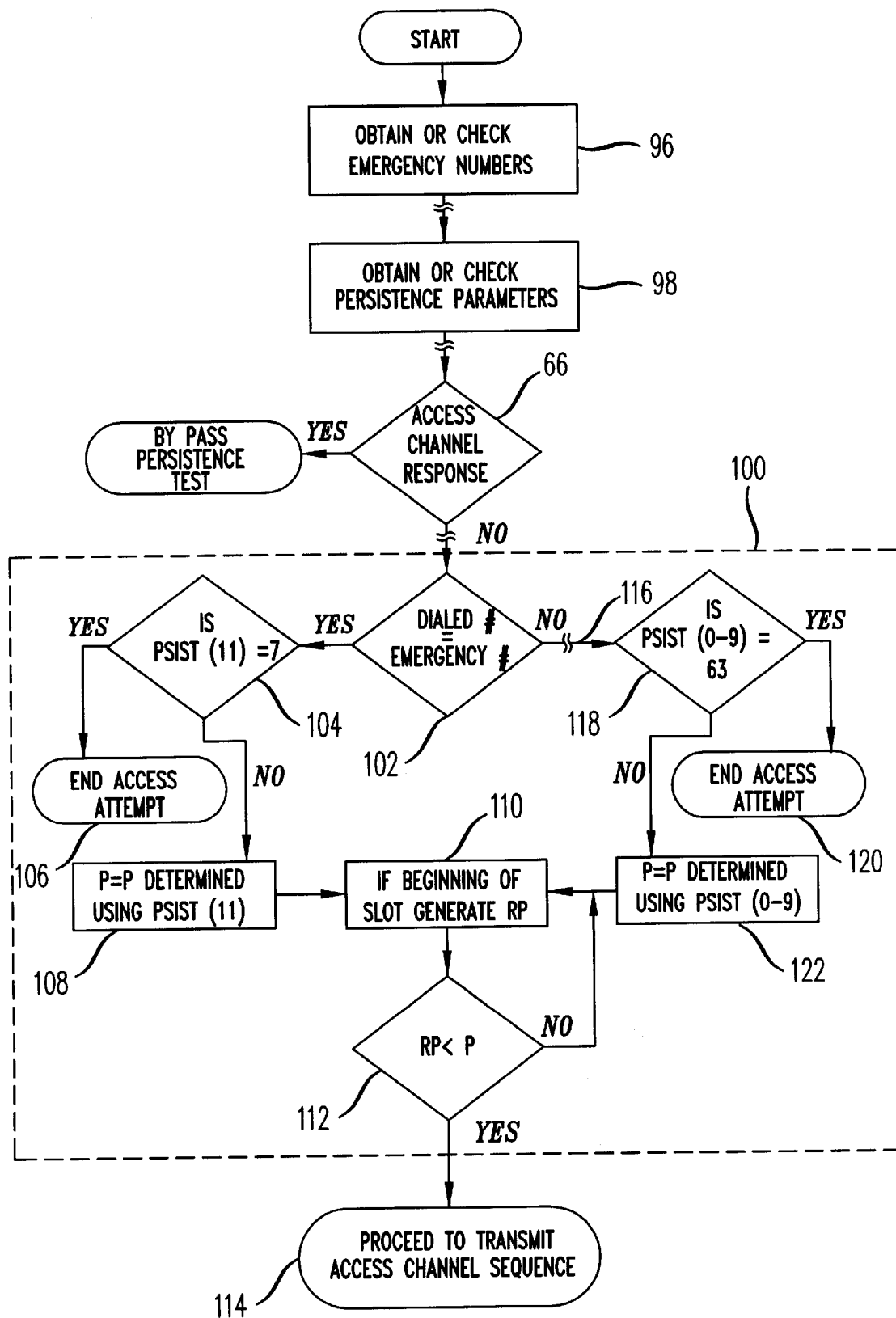

HIGH PRIORITY AND/OR EMERGENCY OVERLOAD ACCESS CONTROL SYSTEM

BACKGROUND OF THE INVENTION

1. Field of The Invention

This invention relates to wireless communications and, more particularly, to a access control system for a cellular communications system.

2. Description of Related Art

FIG. 1 depicts a diagram of a wireless communications system 10 which provide wireless communications service to a number of wireless units (e.g., wireless units 12a–c) that are situated within a geographic region. The wireless cellular communications system 10 comprises a number of base stations 14a–e, geographically distributed to support transmission and receipt of communication signals to and from the wireless units 12a–c, which can be mobile or fixed, in the geographic region. Typically, each cell contains a base station, which comprises the radios and antennas that the base station uses to communicate with the wireless units in that cell. Each base station 14a–e handles voice and/or data communications over a particular region called a cell, and the overall coverage area for the cellular system is defined by the union of cells for all of the cell sites, where the coverage areas for nearby cell sites overlap to some degree to ensure (if possible) contiguous communications coverage within the outer boundaries of the systems coverage area. As depicted in FIG. 1, each cell is schematically represented by one hexagon in a honeycomb pattern; in practice, however, each cell has an irregular shape that depends on the topography of the terrain surrounding the cell. One cell site may sometimes provide coverage for several sectors. In this specification, cells and sectors are referred to interchangeably.

The base stations also comprise the transmission equipment that the base station uses to communicate with a mobile switching center (MSC) for the geographic region. An MSC 16 is responsible for, among other things, establishing and maintaining calls between the wireless units and calls between a wireless unit and a wireline unit (e.g., wireline unit 18). As such, the MSC interconnects the wireless units within the geographic region with a public switched telephone network (PSTN) 20. Within a geographic region, the MSC switches calls between base stations in real time as the wireless unit moves between cells, referred to as call handoff. The MSC 16 is connected to or integrated with a home location register (HLR) 22. The HLR 22 contains subscriber information and location information for all wireless units which reside in the geographic region of the MSC 16.

In a wireless cellular communications system, a base station and a wireless unit communicate voice and/or data over a forward link and a reverse link, wherein the forward link carries communication signals from the base station to the wireless unit and the reverse link carries communication signals from the wireless unit to the base station. There are many different schemes for determining how wireless units and base stations communicate in a cellular communications system. For example, wireless communications links between the wireless units and the base stations can be defined according to different radio protocols, including TDMA (time-division multiple access), FDMA (frequency-division multiple access), and CDMA (code-division multiple access).

In the context of wireless communications systems, subscriber access control allows a service provider to control the availability of communications links to wireless units. In the context of current CDMA systems, a purpose behind subscriber access control was to ensure the availability of communications links if an emergency overload condition should develop. As an example, a technical industry standard that is desirably observed in introducing access controls in a mobile communications system is TIA/EIA-95-A Mobile Station-Base Station Compatibility Standard for Dual-Mode Wideband Spread Spectrum Cellular System (March, 1995) ("IS-95-A"); and ANSI J-STD-008 Personal Station-Base Station Compatibility Requirements for 1.8 to 2.0 GHz Code Division Multiple Access (CDMA) Personal Communications Systems, (Corrected Version—Aug. 29, 1995).

A detailed sequence of activities are typically followed before the wireless unit can access the wireless communications system to establish a call to a phone number. As is known in the art, calls between a CDMA mobile station and a base station typically employ several kinds of channels. Initially, a pilot channel is employed as a reference signal for detecting other forward link channels. A sync channel is used to establish time and frame synchronization at the wireless unit. The sync channel message also provides information about another class of channels, the paging channels.

Paging channels are used to broadcast a variety of control information, including access channel information, contained in the access parameter message. This access parameter message contains information such as persistence parameters (0–9), persistence parameters (10–15), persistence modifiers MSG_PSIST and REG_PSIST, initial access power requirements, the number of access channels, the number of access attempts, maximum size of access messages, values for various overload classes, access attempt backoff parameters and other information of interest to mobiles seeking access to the base station.

To initiate a call and obtain access to the wireless communications system, the user inputs or dials the number into the wireless unit, and the wireless unit stores the phone number in storage, such as a memory. When the user finishes inputting the phone number, the user typically presses a send button to initiate the call. Before the wireless unit can access the wireless communications system, the wireless unit checks to ensure that the parameters received from the base station, such as those in the access parameter message, are current. After the wireless unit updates the parameters or determines that the parameters are current, the wireless unit commences the access procedure.

Access channel(s) are used by the wireless unit to obtain access to the wireless communications system, for example, to originate a call. The IS-95-A standard cited above provides a detailed sequence of activities that are to be followed in transmitting messages over an access channel to a base station. In systems based on the IS-95-A standard, CDMA wireless units transmit on the access channels according to a random access protocol in which the wireless unit attempts to gain access to the wireless communications system, referred to as an access attempt, by sending an access message and receiving (or failing to receive) an acknowledgment for that access message. As shown in FIG. 2, each transmission in the access attempt is called an access probe, and within an access attempt, access probes are grouped into access probe sequences. Each access attempt comprises up to max_req_seq (for a request access) or max_rsp_seq (for a response access) access probe sequences. Each access probe sequence consists of up to 1+NUM_STEP access probes, for example 15, all transmitted on the same Access Channel. The first access probe of each access probe sequence is transmitted at a specified power level relative to a nominal power level, and each subsequent access probe is transmitted at a power level a specified amount higher than the previous access probe.

The timing of access probes and access probe sequences is expressed in terms of Access Channel slots. The transmission of an access probe begins at the start of an Access Channel slot. As shown in FIG. 3, each such access probe comprises an access channel preamble and an access channel message capsule. The length of the preamble 1+pam_sz as well as the length of message capsule 3+max_cap_sz are expressed in terms of a number of 20 millisecond frames. Thus, the duration of an access probe (access channel slot) is 4+pam_sz+max_cap_sz frames.

FIGS. 4a and 4b show an example access procedure according to the IS-95-A standard. In attempting to gain access to the wireless communications system, two types of messages are typically sent on the access channel: a response message (one that is a response to a base station message), or a request message (one that is sent autonomously by the mobile). At block 30, counters PROBE and SEQ are initialized to count the access probe sequence numbers and the access probes. The transmission of an access probe begins at the start of an access channel slot. The precise timing of an access channel slot transmission in an access attempt is determined by a procedure called PN randomization. For the duration of each access attempt, the mobile station computes at block 32 a delay, RN, from 0 to $2^{probe\_pn\_ran}$ PN chips using a (nonrandom) hash function that depends on its electronic serial number, ESN.

The access channel number, RA, used for each access probe sequence is chosen pseudo randomly from 0 to acc-chan among all the access channels associated with the current paging channel as shown in block 34. Once chosen, this access channel number is used by the wireless unit for all access probes in the current access probe sequence. The first access probe of each access probe sequence is transmitted at a specified power level relative to the nominal open loop power level as shown in block 36. The mobile station transmits the first probe in each access probe sequence at a mean output power level (referenced to the nominal CDMA channel bandwidth of 1.23 MHz) depending on open loop power estimate, the initial power offset for access init_pwr and the nominal transmit power offset nom_pwr.

The mobile station delays its transmit timing of each access probe by RN PN chips as shown in block 38. Timing between access probes of an access probe sequence is also generated pseudo-randomly. After transmitting each access probe, the mobile waits a specified period, TA=80×(2+acc_tmo) milliseconds from the end of the slot to receive an acknowledgment from the base station as shown by blocks 40 and 42. If an acknowledgment is received, the access attempt is successful as shown in block 44. If no acknowledgment is received within the time TA, the next access probe in the access probe sequence is transmitted after an additional backoff delay RT, from 1 to 1+probe_bkoff slots as shown by blocks 46–52. As shown in block 54, the next access probe and each subsequent access probe is transmitted at a power level a specified amount PI dB (determined from pwr_step) higher than the previous access probe until an acknowledgment response is obtained or the sequence ends as determined at block 48. Each access attempt comprises up to max_req_seq (for a request access) or max_rsp_seq (for a response access) access probe sequences as shown by blocks 56 and 58. If an acknowledgment has not been received after the last access probe sequence has been transmitted, the access attempt fails as shown in block 60. After an access probe sequence, a backoff delay, RS, of from 0 to 1+bkoff slots is generated pseudo randomly and applied as shown by blocks 62 and 64.

If the access attempt is an Access Channel request as determined at block 66, then before transmitting an access probe in each access probe sequence, the wireless station performs a persistence test 68 for every Access Channel slot. The wireless unit transmits the first access probe of an access probe sequence in a slot only if the wireless unit passes the persistence test for that slot. To perform the persistence test, the wireless unit generates a random number RP (0<RP<1) and compares it with a pre-determined threshold P as shown in blocks 70 and 72. If the generated random number RP is smaller than the pre-determined threshold P, transmission of the access probe sequence is initiated at step 34. If the persistence test fails, the access probe sequence is deferred until at least the next slot. Thus, in the case of access channel request, an additional delay PD can imposed before each access probe sequence by the persistence test. The pre-computed threshold P varies, depending on the nature of the request, the access overload class n, the persistence value psist(n) for the overload class which is found in the access parameters message from the base station, and its persistence modifier msg_psist (for message transmission) or reg_psist (or registrations). The maximum persistence value psist(n) is 63 for access overload classes 0 through 9, and is 7 for access overload classes 10 through 15. If the maximum persistence value is assigned to the wireless unit, then P=0 and the wireless unit ends the access attempt. For an Access Channel request by a wireless unit of access overload classes 0 through 9 (non-emergency), if psist(n) is not equal to 63, then, P is a monotonic decreasing function of psist(n) given the appropriate persistence modifier. For example, if the access channel request is a message request and psist (n) is not equal to 63, P is computed by $P=2^{-psist(n)/4} * 2^{-msg\_Psist}$. The larger the value for psist(n), the smaller the value for P, and the smaller the probability of initiating the access probe sequence. A larger value for P implies a higher probability of initiating the access probe sequence. For an Access Channel request by a wireless unit of access overload classes 10 through 15 (emergency), if psist(n) is not equal to 7, then, P is computed by $2^{-psist(n)} * 2^{-msg\_psist}$ When in overload, the base station will try to increase the delay between access probes for ordinary overload classes of wireless units (e.g. class 0–9) rather than those for high priority and/or emergency classes (e.g. classes 10–15). In overload situations, P will decrease because the base station will increase the persistence values psist(n) for the ordinary overload classes, thereby making the persistence test even more difficult to pass. Thus, in an overload condition, the probability of an emergency class wireless unit initiating the access probe sequence is much higher than the non-emergency class wireless units.

Table 1 summarizes persistence test thresholds for various types of requests and access overload classes used in systems based on the IS-95-A standard. Table 1 shows that the maximum persistence value is 63 for access overload classes 0 through 9, and is 7 for access overload classes 10 through 15. If the maximum persistence value is assigned to the mobile station, the access attempts fails.

TABLE 1

Persistence Test Threshold P

| | access overload classes n = 0, 1, . . . , 9 | | access overload classes n = 10, 11, . . . , 15 | |
|---|---|---|---|---|
| | psist(n) ≠ 63 | psist(n) = 63 | psist(n) ≠ 7 | Psist(n) = 7 |
| Registration Request | $2^{-\frac{psist(n)}{4}-reg\_psist}$ | 0 | $2^{-psist(n)-reg\_psist}$ | 0 |
| Message Request | $2^{-\frac{psist(n)}{4}-msg\_psist}$ | 0 | $2^{-psist(n)-msg\_psist}$ | 0 |
| Other Request | $2^{-\frac{psist(n)}{4}}$ | 0 | $2^{-psist(n)}$ | 0 |

Table 2 summarizes average persistence delay for various types of access channel requests as known in systems based on the IS-95-A standard.

TABLE 2

Table 2 summarizes average persistence delay for various types of access channel requests as known in systems based on the IS-95-A standard Average Persistence Delay E{PD}

| | access overload classes n = 0, 1, . . . , 9 | | access overload classes n = 10, 11, . . . , 15 | |
|---|---|---|---|---|
| | psist(n) ≠ 63 | psist(n) = 63 | psist(n) ≠ 7 | Psist(n) = 7 |
| Registration Request | $2^{\frac{psist(n)}{4}+reg\_psist} - 1$ | ∞ | $2^{psist(n)+reg\_psist} - 1$ | ∞ |
| Message Request | $2^{\frac{psist(n)}{4}+msg\_psist} - 1$ | ∞ | $2^{psist(n)+msg\_psist} - 1$ | ∞ |
| Other Request | $2^{\frac{psist(n)}{4}} - 1$ | ∞ | $2^{psist(n)} - 1$ | ∞ |

Thus, in an overload condition, a wireless unit in a normal overload class (e.g. overload class 0–9) can experience significant delay even when it is making a high priority call, such as an emergency call.

SUMMARY OF THE INVENTION

The present invention involves a high priority and/or emergency overload access control system in which a wireless unit is treated as a higher priority wireless unit when the wireless unit is attempting to access a wireless communications system with a high priority call, such as an emergency call. For example, the overload access control system can recognize if the wireless unit is attempting to initiate a call to an emergency number. If so, the wireless unit can perform a persistence test as an emergency class (e.g. overload class 10–15) wireless unit in attempting to access the wireless communications system. Thus, the wireless unit will experience an increased probability of passing the persistence test and thereby reducing the persistence delay in attempting to access the wireless communications system with the emergency call.

BRIEF DESCRIPTION OF THE DRAWINGS

Other aspects and advantages of the present invention may become apparent upon reading the following detailed description and upon reference to the drawings in which:

FIGS. 4a and 4b show a flow diagram of an example access procedure which can incorporate the overload access control system according to the principles of the present invention;

FIG. 5 shows an embodiment of the overload access control system to be incorporated in the access procedure of FIG. 4 according to the principles of the present invention; and FIG. 6 shows a more detailed embodiment of the overload access control system according to the principles of the present invention.

DETAILED DESCRIPTION

Illustrative embodiments of the high priority and/or emergency overload access control system according to the principles of the present invention is described with respect to a CDMA wireless communications system based on the well-known IS-95-A standard. Such context should not be considered as limiting on the applicability of the present inventive teachings, nor on the scope of the appended claims.

Figure 1:
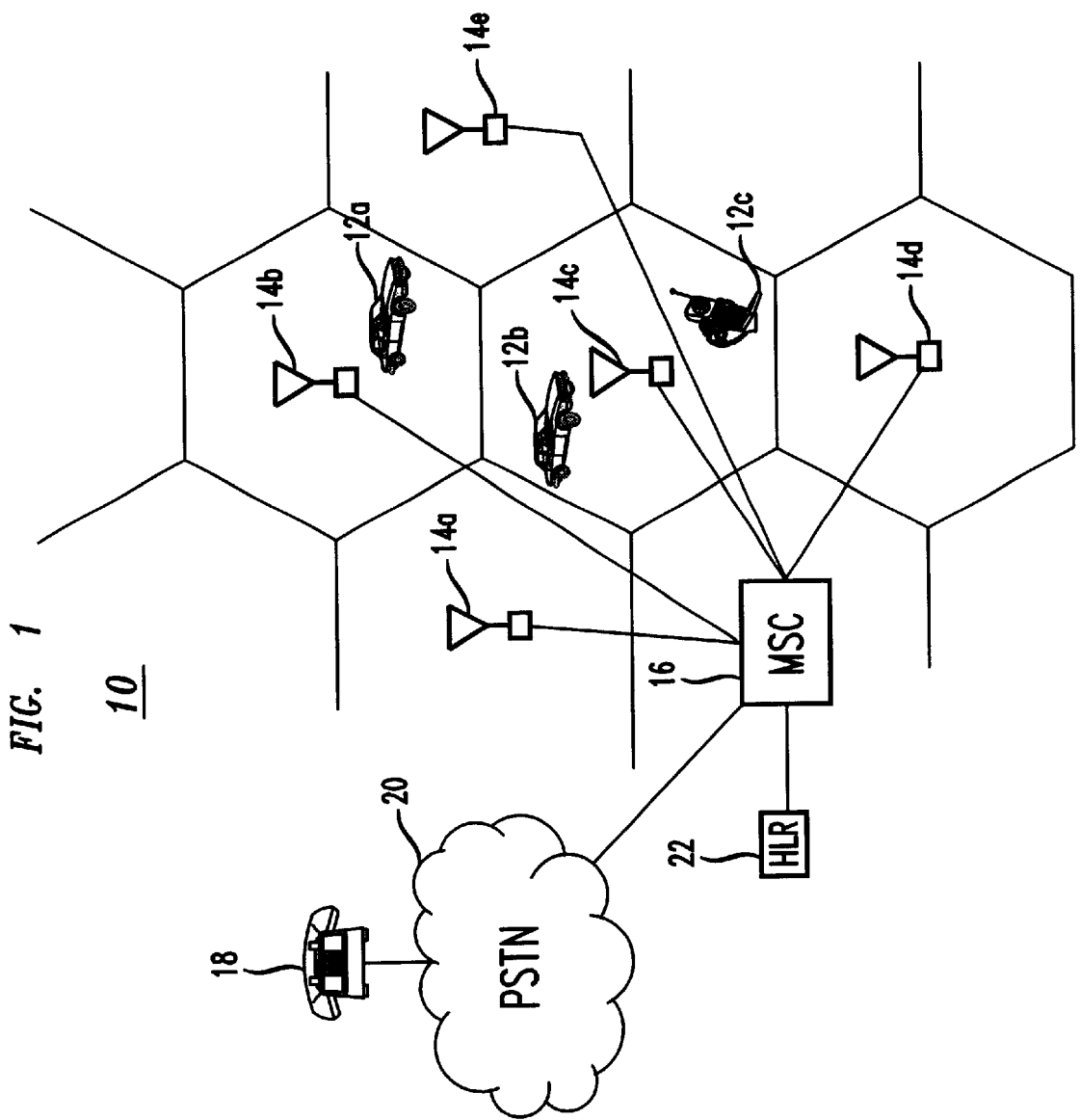
FIG. 1 shows a general diagram of a wireless communications system which can use the high priority and/or emergency overload access control system according to the principles of the present invention.
Figure 2:
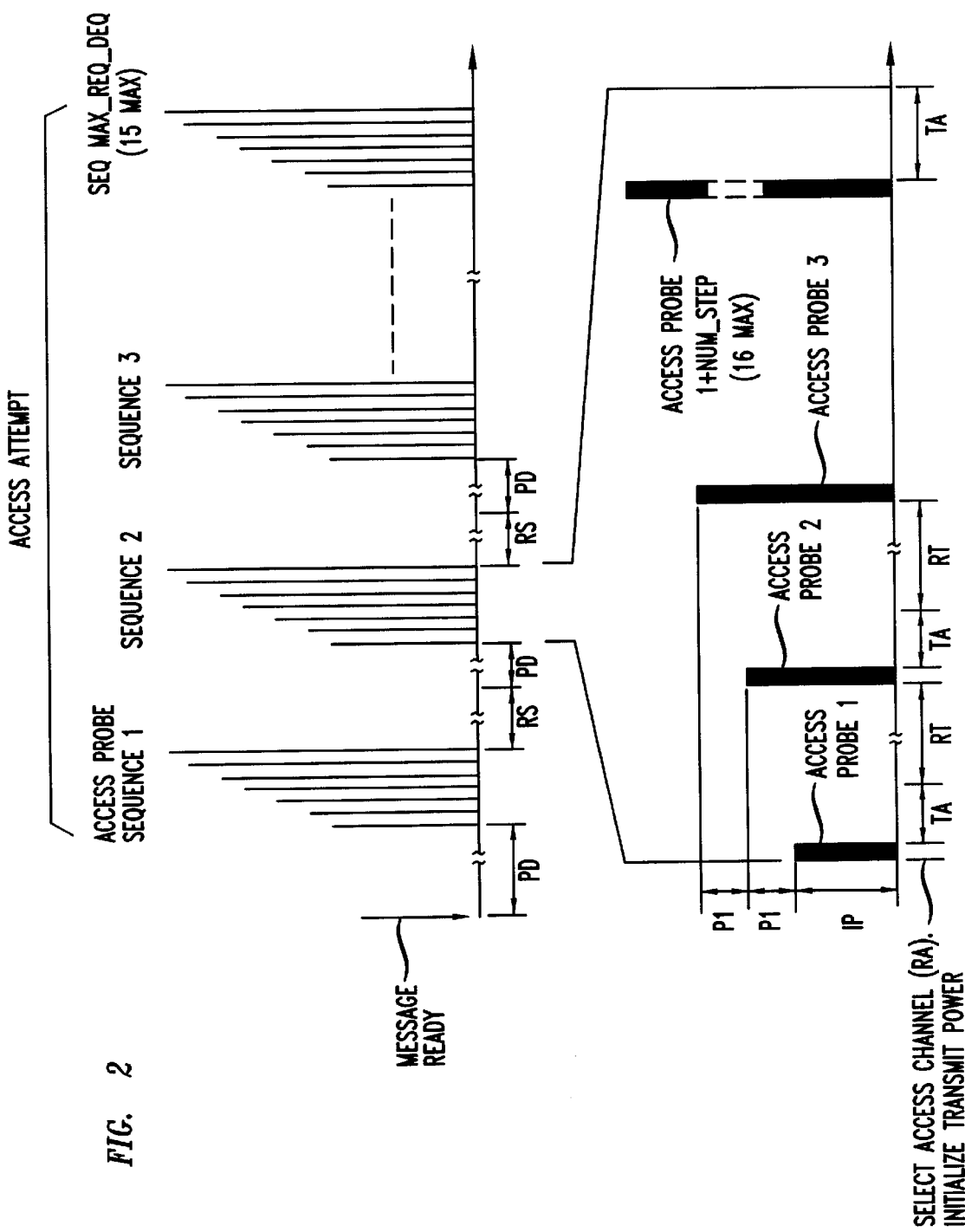
FIG. 2 shows timing for illustrative access probe sequences.
Figure 3:
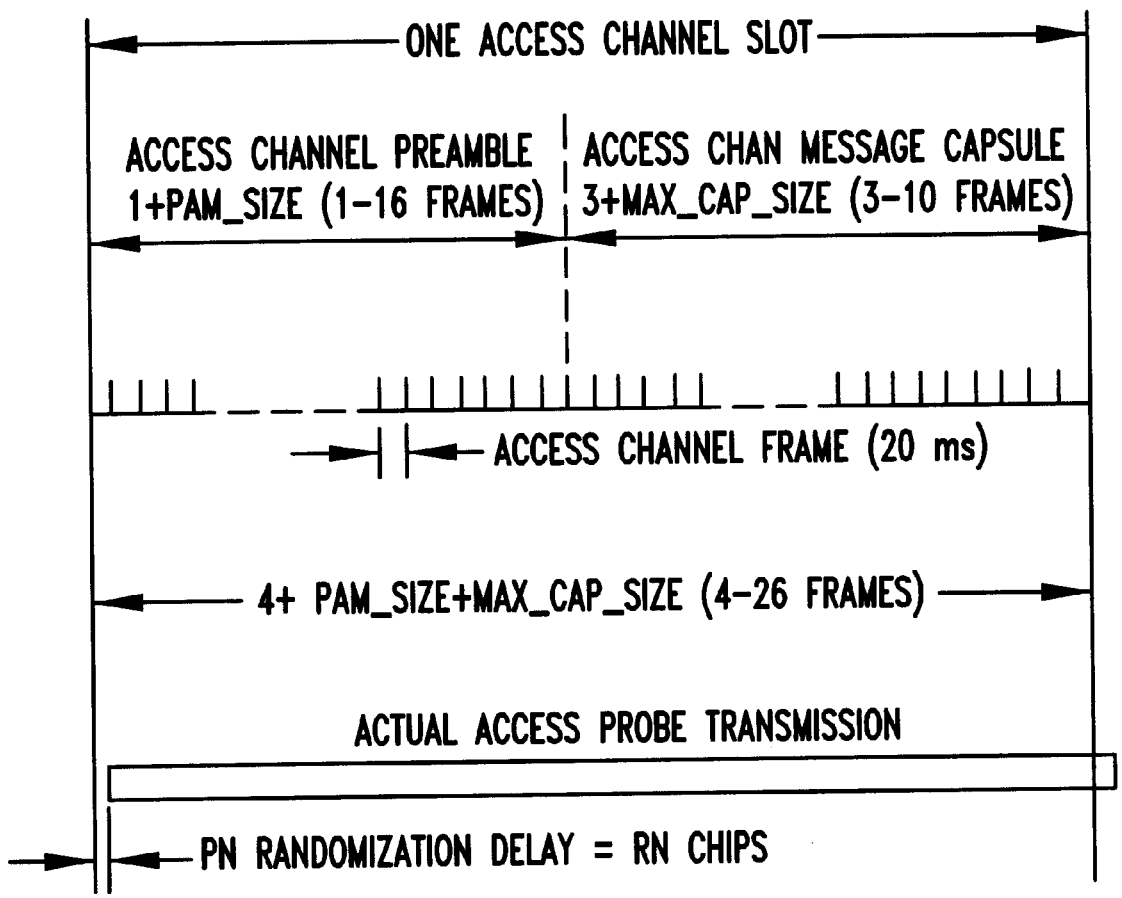
FIG. 3 is a representation of an access request from a typical wireless unit.
Figure 4B:
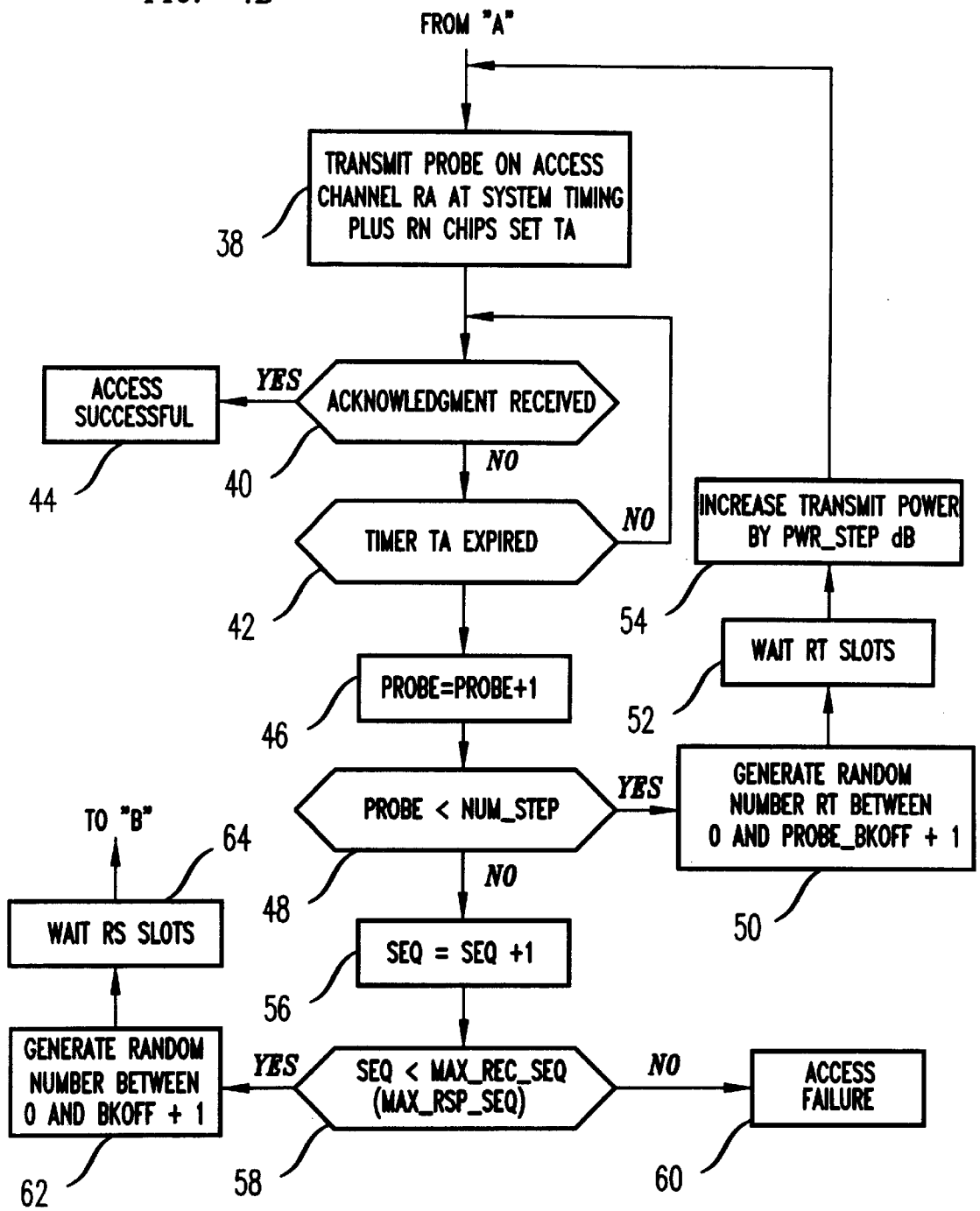

FIG. 5 shows an embodiment 80 of the high priority and/or emergency overload access control system performed in the processing circuitry of a wireless unit of a normal overload class, for example overload classes 0 to 9, according to the principles of the present invention. The overload access control system has been incorporated in the access procedure of FIG. 4 as performing the persistence test. Other embodiments can be incorporated as part of an access procedure in different ways. At block 82, the emergency and/or high priority persistence test 80 is initiated because an access channel request is being made by the wireless unit. If an access channel response is being made, for example, if the wireless unit is receiving a call, then the persistence test is typically bypassed. If the access control system of the wireless unit determines that an access channel request is to be made by the wireless unit, for example after dialing a phone number and pressing the send button on a typical wireless unit, the overload access control system determines at block 84 whether the phone number dialed into the wireless unit corresponds to an emergency number or a high priority number or code. For example, if the wireless unit dials the emergency number 911, the overload access control system recognizes that an emergency number has been dialed. In this embodiment, if the dialed number is not an emergency number, the overload access control system proceeds with the persistence test using a P calculated with the persistence value psist(n) where n corresponds to an ordinary overload class 0 to 9 as shown in block 86.

In this embodiment, if the wireless unit determines that the number dialed corresponds to an emergency number at block 84, the overload access control system proceeds with the persistence test using a P calculated with the persistence value psist(n) where n corresponds to a high priority and/or emergency overload class, for example the overload class 11 corresponding to an emergency class wireless unit as shown in block 88. Alternatively, if the number dialed corresponds to an emergency and/or high priority number, the persistence test can be bypassed as shown by line 85. The overload access control system generates a random number RP at the beginning of an access channel slot at block 90. At block 92, if RP is not less than P, the persistence test fails, and the overload access control system proceeds to block 90 to generate another random number at the beginning of the next access channel slot. If RP is less than P, which is highly likely if P is generated using an persistence value psist(11) for the emergency overload class, then the persistence test is passed at block 94, and the wireless unit proceeds to transmit an access probe sequence according to the remainder of the example access procedure.

The above-described embodiment of the overload access control system reflects the logic used in incorporating the overload access control system into the access procedure for the IS-95-A standard. Alternative embodiments of the overload access control system are possible in which high priority and/or emergency number(s) can be recognized by the overload access control system to alter the access procedure and/or the persistence test by having the overload access control system in the wireless unit use high priority and/or emergency parameter(s) in attempting to access the system. Other changes in the implementation and the manner of incorporating the overload access control system into the example access procedure as described below or other access procedures are possible. For example, portions of the high priority and/or access control system can be inserted at different points within and/or before the example access procedure or other access procedures to calculate P values and/or make a determination as to which P values to use or which to calculate based on whether the dialed number is an emergency or high priority number. Moreover, depending on the embodiment, multiple P values for different overload classes can be calculated initially, and after the class of the phone number is recognized then the appropriate P value is used in the persistence test. Alternatively, the P values can be updated when new persistence values are received from the base station, or re-calculated at each pass through the persistence test to ensure that updated persistence parameters are used to calculate the P values. New P values can be determined or the comparison of the dialed phone number can occur once per access attempt or after each pass through the persistence test, to ensure updated information is used. Furthermore, the overload access control system can obtain emergency and/or higher priority number(s) from a storage which can be programmed initially into the wireless unit, periodically updated, or updated through messages from the base station.

FIG. 6 shows an alternative or more detailed embodiment of the emergency and/or high priority access control system according to the principles of the present invention. At block 96, the wireless unit obtains the emergency and/or high priority number(s) or determines whether the emergency and/or high priority numbers stored at the wireless unit are current. In certain embodiments, the base station broadcasts emergency number(s) and/or high priority number(s) which the wireless unit can obtain, store and use to determine whether the wireless unit is being used to place an emergency and/or high priority call. The emergency number(s) and/or high priority number(s) can be transmitted to the wireless unit as part of the access parameter message, as part of other overhead messages sent over the paging channel or other channels, or as a message sent from the base station to the wireless unit in other possible manners. When the user initiates a call, the wireless unit can determine if the emergency and/or high priority number(s) are current. Additionally, at block 98, the overload access control system obtains the persistence parameters or determines whether the persistence parameters stored in the wireless unit are current. Similarly, the wireless unit receives the persistence parameters from the base station as part of the access parameter message. When the user initiates a call on the wireless unit, the wireless unit checks if the persistence parameters as well as other parameters are current. Depending on the embodiment, blocks 96 and 98 can be performed at the same time, in a different order or during persistence test 100.

As discussed above, when the wireless unit attempts to gain access to the wireless communications system, the wireless unit determines whether the access attempt is an access channel response or an access channel request. In this embodiment at the block 66, if the access attempt is an access channel response, the persistence test 100 is bypassed. If the access attempt is an access channel request, for example to initiate an emergency call, the persistence test 100 is performed according to the principles of the present invention. At block 102, the overload access control system determines if the dialed number matches an emergency number, for example 911. In this embodiment, if the dialed number is an emergency number, the overload access control system determines at block 104 whether psist(n)=7, where n=11 which corresponds to an emergency class wireless unit. If psist(11)=7 (indicating that the base station has set the psist(11) field of the access parameters message to prevent wireless units of the emergency class from transmitting requests on the Access Channel), then the overload access control system ends the access attempt at block 106. If psist(11) is not equal to 7, the overload access control system uses a P calculated from the persistence value psist(11) corresponding to the emergency class for wireless units as shown at block 108. At block 10, the overload access control system generates a random number RP at the beginning of an access channel slot. At block 112, if RP is not less than the appropriate P value, the persistence test fails, and the overload access control system proceeds back to block 110 to generate a new random number RN at the beginning of an access channel slot in this embodiment. At block 112, if RP is less than P, which is highly likely if P is generated using an persistence value psist(11) for the emergency overload class, then the persistence test is passed and the wireless unit proceeds to transmit an access probe on the access channel as shown in block 114.

At block 102, if the dialed number is not an emergency number, the persistence test proceeds according to the access procedure of IS-95-A in this embodiment. The line 116 is shown as broken because in alternative embodiments the dialed number could be compared to other emergency and/or high priority numbers, and as would be understood by one of skill in the art, a P determined using the corresponding persistence parameters would be used in the comparison 112. At block 118, if the dialed number is not an emergency and/or high priority number, the overload access control system determines whether psist(n)=63 where n is a normal overload class from 0 to 9. If psist(0–9)=63 (indicating that the base station has set the psist(0–9) field of the access parameters message to prevent wireless units of this class from transmitting requests on the Access Channel), then the access attempt is ended at block 120. If psist(0–9) is not equal to 63, then at block 122 the overload access control system uses a P calculated from the persistence value for psist(0–9) obtained from the access parameters message. At the block 110, the overload access control system generates the random number RP at the beginning of an access channel slot. As described above for the block 112, if RP is less than the appropriate P, then the persistence test is passed and the wireless unit proceeds to transmit an access probe on the access channel as shown in block 114. If RP is not less than P, the persistence test fails, and the overload access control system proceeds back to block 110 to generate a new random number RN at the beginning of an access channel slot in this embodiment.

In addition to the embodiment(s) described above, the emergency and/or high priority overload access control system according to the principles of the present invention has been described with a particular system, but the overload access control system can be used with different cellular systems and configurations which omit and/or add components and/or use variations or portions of the described system. For example, the overload access control system has been described with particular reference to a CDMA wireless unit in a wireless communications system using the IS-95-A standard, but other wireless systems using different standards (such as TIA/EIA-95-B Mobile Station-Base Station Compatibility Standard For Dual Mode Spread Spectrum Systems (Oct. 1, 1998) ("IS-95-B") and/or radio protocols, such as time division multiple access (TDMA), can use the overload access control system. It should be understood that different notations, references and characterizations of the various transmissions, parameters, and/or architecture blocks can be used. For example, in IS-95-B, access attempts are divided into access sub-attempts, and the overload access control system can be used in the context of access attempts and/or access sub-attempts. Furthermore, the described system and/or portions thereof can be implemented in different manners, for example not incorporated within the access channel procedure but with another process operating within the wireless unit and/or the wireless communications system. Additionally, the overload access control system and portions thereof can be implemented in application specific integrated circuits, software-driven processing circuitry, firmware or other arrangements of components in a wireless unit, such as a cellular phone, the base station and/or the MSC as would be understood by one of ordinary skill in the art with the benefit of this disclosure. What has been described is merely illustrative of the application of the principles of the present invention. Those skilled in the art will readily recognize that these and various other modifications, arrangements and methods can be made to the present invention without strictly following the exemplary applications illustrated and described herein and without departing from the spirit and scope of the present invention.

What is claimed is:

1. A method of controlling access to a wireless communications system by a wireless unit, said method comprising:
   determining if a call number input into said wireless unit is of high priority;
   determining a P value calculated from a high priority persistence value if said call number is determined to be of high priority; and
   initiating an access channel transmission depending on the results of a comparison involving said P value.

2. The method of claim 1 wherein determining including:
   providing at least one high priority number to be stored in said wireless unit; and
   comparing said call number input into said wireless unit with said at least one high priority number stored in said wireless unit to determine if said call number is of high priority.

3. The method of claim 2 wherein providing further including:
   providing at least one emergency number as said at least one high priority number to be stored in said wireless unit.

4. The method of claim 2 further including:
   obtaining said at least one high priority number from a base station.

5. The method of claim 2 wherein said steps of determining and initiating including:
   determining said P value calculated from said high priority persistence value if said comparing indicates said call number is of high priority;
   generating a random number for a persistence test;
   comparing said P value to said random number; and
   initiating an access channel transmission if results of said comparing indicate a passing of said persistence test.

6. The method of claim 5 further including:
   repeating said steps of generating and comparing if said persistence test fails.

7. The method of claim 5 further including:
   determining a P value calculated from a different priority persistence value if said comparing indicates said call number is not of high priority.

8. A wireless unit comprising:
   an access control system configured to determine if a call number input into said wireless unit is of high priority and to determine a P value calculated from a high priority persistence value if said call number is determined to be of high priority and to initiate an access channel transmission depending on the results of a comparison involving said P value.

9. The apparatus of claim 8 wherein said access control system stores at least one high priority number in said wireless unit and compares said call number with said at least one high priority number stored in said wireless unit to determine if said call number is of high priority.

10. The apparatus of claim 9 wherein said at least one high priority number being an emergency number.

11. The apparatus of claim 9 wherein said wireless unit configured to obtain said at least one high priority number from a base station.

12. The apparatus of claim 9 wherein said access control system configured to determine said P value calculated from said high priority persistence value if said call number is of high priority and to generate a random number for a persistence test, said random number being compared to said P value to initiate an access channel transmission.

13. A method of controlling access to a wireless communications system by a wireless unit, said method comprising:

determining if said wireless unit is initiating a high priority call;

determining a P value calculated from a higher priority persistence value if said wireless unit is determined to be initiating said high priority call;

determining a P value calculated from a different persistence value if said wireless unit is determined not to be initiating said high priority call; and initiating an access channel transmission depending on the results of a comparison involving said P value.

14. A wireless unit comprising circuitry configured to determine said wireless unit is initiating a high priority call, said circuitry configured to determine a P value calculated from a high priority persistence value if said wireless unit is determined to be initiating said high priority call, to determine a P value calculated from a different priority persistence value if said wireless unit is not initiating said high priority call, and to initiate an access channel transmission depending on the results of a comparison involving said P value.

* * * * *